Figure 1:
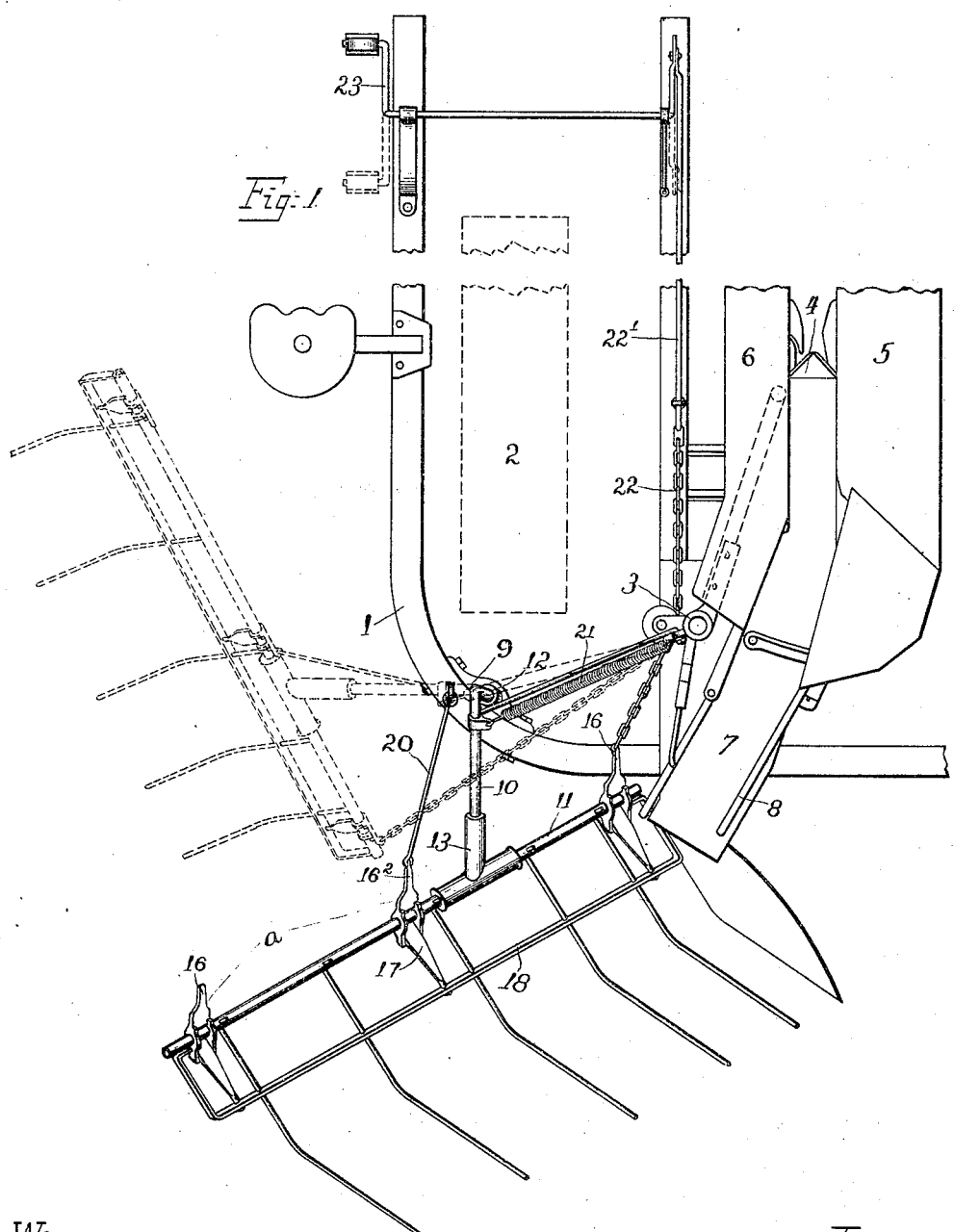

No. 779,162. PATENTED JAN. 3, 1905.
H. R. INGLEDUE.
BUNDLE CARRIER FOR CORN HARVESTERS.
APPLICATION FILED OCT. 24, 1904.

3 SHEETS—SHEET 1.

Witnesses:
J. N. Daggett.
J. W. Hoffmeister.

Inventor
Harvey R. Ingledue.
By J. C. Warnes,
Atty

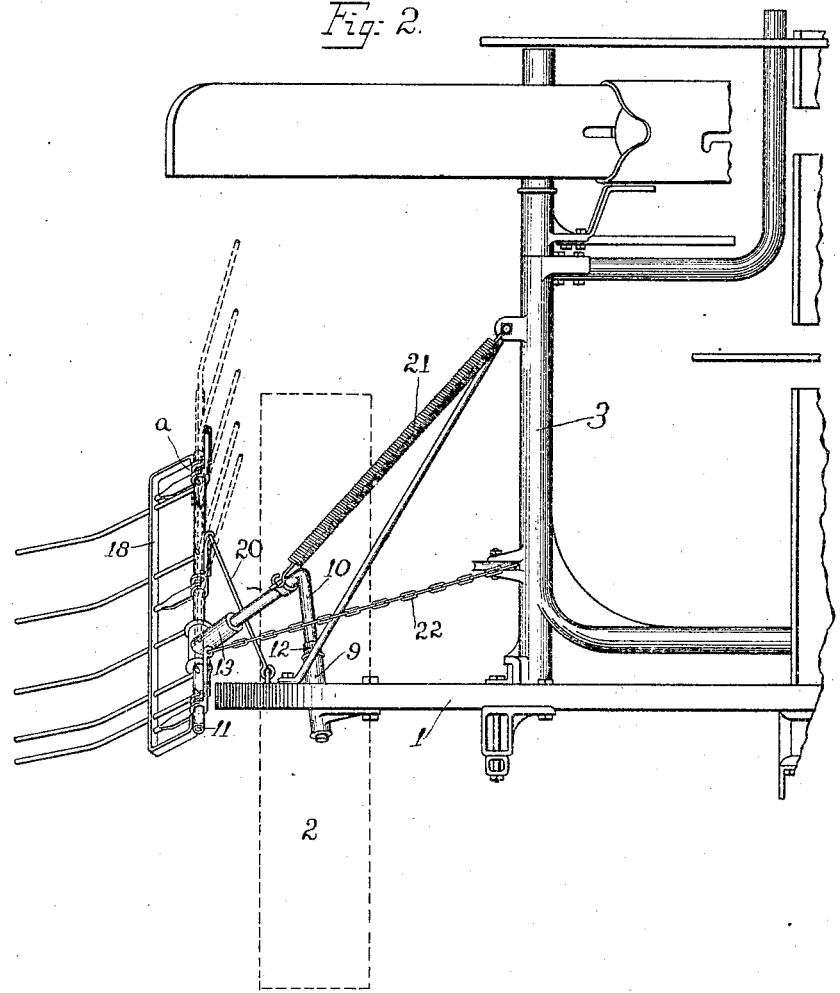

No. 779,162. PATENTED JAN. 3, 1905.
H. R. INGLEDUE.
BUNDLE CARRIER FOR CORN HARVESTERS.
APPLICATION FILED OCT. 24, 1904.
3 SHEETS—SHEET 3.
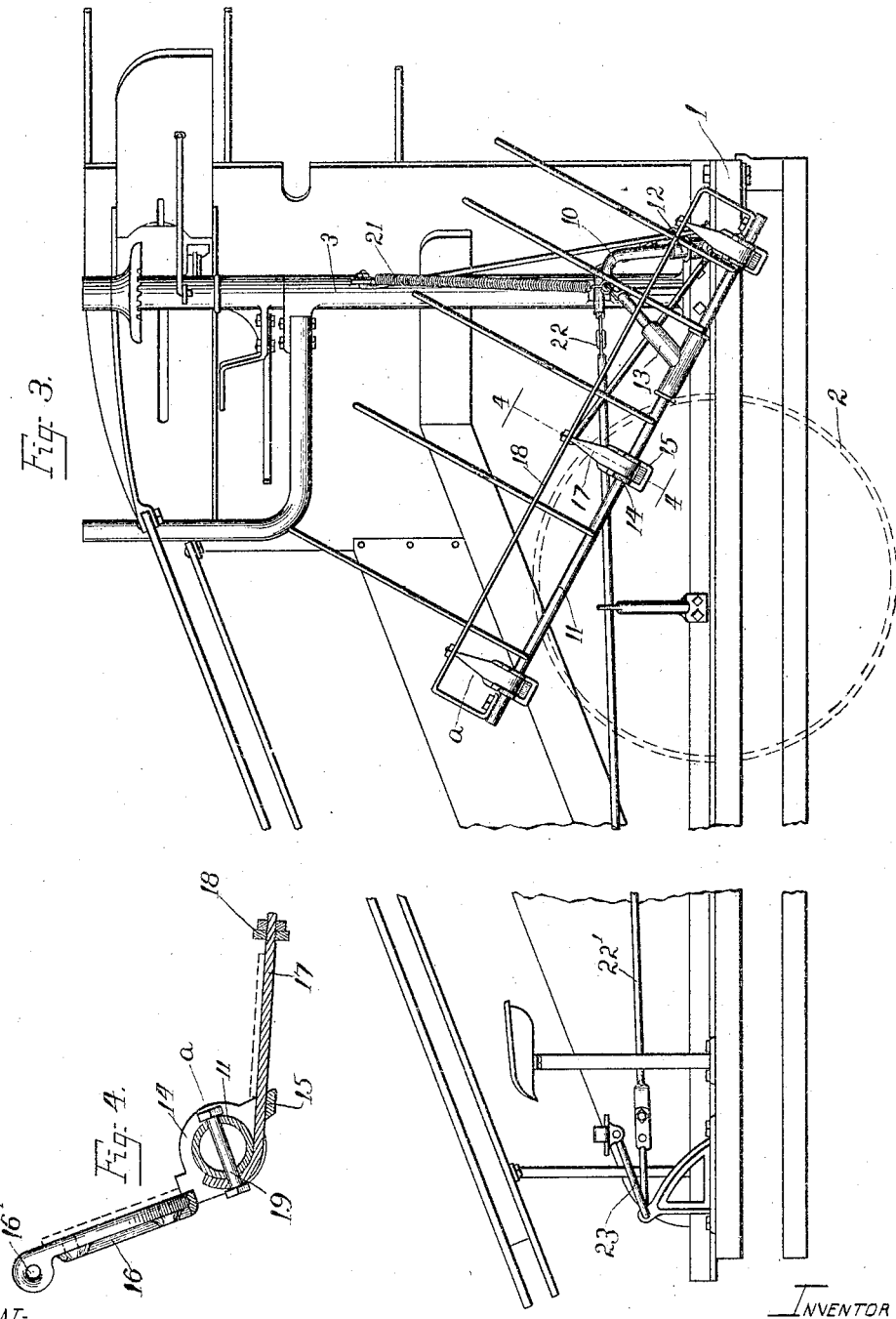
Witnesses:
J. N. Daggett.
F. W. Hoffmeister.
Inventor
Harvey R. Ingledue.
By J. C. Warnes,
Atty.

No. 779,162.　　　　　　　　　　　　　　　　　　Patented January 3, 1905.

UNITED STATES PATENT OFFICE.

HARVEY R. INGLEDUE, OF CHICAGO, ILLINOIS, ASSIGNOR TO INTERNATIONAL HARVESTER COMPANY, A CORPORATION OF NEW JERSEY.

BUNDLE-CARRIER FOR CORN-HARVESTERS.

SPECIFICATION forming part of Letters Patent No. 779,162, dated January 3, 1905.

Application filed October 24, 1904. Serial No. 229,720.

*To all whom it may concern:*

Be it known that I, HARVEY R. INGLEDUE, a citizen of the United States, residing at Chicago, in the county of Cook and State of Illinois, have invented a new and useful Improvement in Bundle-Carriers for Corn-Harvesters, of which the following is a complete specification.

This invention relates more particularly to bundle-carriers for use on corn-harvesting machines of the class in which the binder is arranged in substantially a vertical position, the corn being cut, bound, and discharged before being prostrated. The bundle-carrier occupies a position somewhat inclined, so that the bundles are received from the binder in an upright position, are held somewhat obliquely, and finally deposited in a prostrate position upon the ground.

The object of this invention is the production of a bundle-carrier light and simple in construction and one which can be readily swung forward and folded over the main wheel of the machine when it would in its normal position interfere with the free passage of the machine through the corn in first opening up the field or in passing through a narrow gate, such folding being made without loosening or detaching any part thereof.

The present invention may be regarded as an improvement on the bundle-carrier set forth in Patent No. 760,420, issued to H. J. Case May 24, 1904.

Referring to the drawings, Figure 1 represents a plan view of a portion of a corn-harvester and the improved bundle-carrier in connection therewith, the bundle-carrier being shown in its receptive position in full lines and in its dumping position in dotted lines. Fig. 2 is a rear elevation of the bundle-carrier and the binder-frame, showing the method of supporting the former on the latter, the full lines indicating the position of the bundle-carrier when swung to a position ready to fold, while the dotted lines show it in its folded position. Fig. 3 represents a stubble-side elevation substantially of those parts set forth in Fig. 1 and shows the bundle-carrier in its folded position; and Fig. 4 is an enlarged transverse section through the supporting-hinge of the bundle-carrier frame, taken as indicated by the line 4 4 in Fig. 3.

In the drawings, 1 designates a portion of the main frame of a corn-harvester; 2, the main supporting and driving wheel; 3, the frame of the vertically-disposed binder; 4, the knife for severing the corn, and 5 and 6 the upper grainward and stubbleward boards, respectively, which aid in forming the stalk passage-way.

7 is the board or plate extending rearward and stubbleward from the binder and forming the bottom of the stalk passage-way, while 8 is a tops-retarder to guard and deflect the movement of the tops of the bundles in their passage from the vertically-disposed binder to the bundle-carrier.

9 is the bearing for the bundle-carrier support secured to the main frame of the harvester stubbleward and slightly rearward of the binder-frame 3. This bearing consists, essentially, of a sleeve, the upwardly-extending axis of which is inclined stubbleward and slightly forward, and the laterally-extending lugs for securing it to the frame of the machine. In this sleeve is journaled the vertically-inclined portion of the bundle-carrier support formed by the bent bar 10. On the free end of the laterally-extending portion of this support is mounted the finger-post 11 of the bundle-carrier. To take the end thrust of the load on the bar 10, a collar 12 is secured to said bar above the sleeve of the bearing 9. The connection between the bent bar 10 and the post 11 of the bundle-carrier may be effected in any desired manner; but the connection is shown as consisting of a T-shaped casting 13 in the longitudinal branch of which sleeves the finger-post 11 of the bundle-carrier, while to the T-branch thereof is rigidly secured the bundle-carrier support 10.

Since the above-mentioned elements constitute no part of this invention, a more specific description is deemed unnecessary, and for further details reference may be had to the above-mentioned patent. They are of importance in this connection only in so far as they illustrate the application of my improvement, which will now be described.

As above stated, the finger-post 11 on the bundle-carrier sleeves in the longitudinal branch of the T-shaped casting 13, and to control the movement of said bundle-carrier frame the hinges $a$, preferably three in number, are employed. These hinges consist of two members the sleeve portion 14 of each of which is opened between to form a gap and provided below with the connecting-web 15 and above with the upwardly-extending arm 16. This part of the hinge sleeves loosely upon the finger-post 11 and engages in the gap thereof the second member 17. This second member consists of a strap-bolt the outer end of which is secured to the finger-brace bar 18 and the inner end of which is curved up to engage the finger-post 11, it being secured thereto by means of the bolt 19. The upper end of each arm 16, except the outer one, is provided with an eye $16'$. With the eye $16'$ of the inner arm $16^2$ connects the rod 20, the other end thereof being pivotally secured to the frame of the machine at a point stubbleward of and laterally coincident with the pivotal axis of the bundle-carrier support 10. This arrangement will enable the said connecting-rod to support and control the movement of the bundle-carrier frame in the manner fully explained in the patent above referred to. The fact that the connection with the frame is laterally coincident with the pivotal support of said carrier will cause the fingers of the bundle-carrier to be held rigidly in a receptive position, as shown in Fig. 1; but when allowed to swing stubbleward to the dotted-line position in the same figure the fingers will be tipped down, as shown. As the swinging movement of the bundle-carrier continues forwardly or rearwardly the connecting-rod 20 will operate in a similar manner to again raise the fingers thereof. If swung forwardly to the position shown in full lines in Fig. 2, the frame can be raised by hand to the dotted-line position shown in the same figure, the finger-post 11 turning in its support and the hinges $a$ permitting such folding action. In its folded position the bundle-carrier will then lie in a plane inclined slightly inwardly from the vertical and adjacent to the main wheel, where it will be held by gravity until again required for use, when it can be folded down and swung to position. Because of this novel hinge connection the bundle-carrier frame can be folded to a non-interfering position, or it can be let down to a working position without detaching or loosening a single piece in connection therewith.

The long helical spring 21 is interposed between the binder-frame 3 and the bundle-carrier support, the office thereof being to hold the bundle-carrier yieldingly in its receptive postion, and when the same is swung stubbleward for dumping this spring yields sufficiently to permit of such movement. The bundle-carrier is operated by means of the chain 22, which connects forwardly to the rod $22'$ and this with the foot-lever 23, the rear end of the chain connecting with the arm 16 of the inner hinge $a$.

What I claim as my invention, and desire to secure by Letters Patent, is—

1. In a corn-harvester provided with a vertically-arranged binder, in combination, a bundle-carrier support pivotally mounted on the stubble side of said harvester and having its axis of movement inclined from the vertical upward and stubbleward, a bundle-carrier frame pivotally secured to said support, the pivotal axis thereof extending longitudinally with respect thereto and the point of securement being laterally disposed with respect to the pivotal axis of the support, the said bundle-carrier frame being arranged to fold upwardly and inwardly about said pivotal axis, and controlling means for said bundle-carrier frame which will sustain it in normal working position and permit it to be folded, substantially as described.

2. In a corn-harvester provided with a vertically-arranged binder, in combination, a bundle-carrier support pivotally mounted on the stubble side of said harvester and having its axis of movement inclined from the vertical upward and stubbleward, a bundle-carrier frame vibratably secured to said support, the point of securement being laterally disposed with respect to the pivotal axis of the support, means for automatically controlling the movement of said bundle-carrier frame in its bearings on said support as the frame swings to deposit its load, said means consisting of a rod connecting with the frame of the machine at a point laterally coincident with the pivotal axis of said bundle-carrier support, and a hinge which will hold the bundle-carrier frame in working position and yet permit it to be folded upwardly, substantially as described.

HARVEY R. INGLEDUE.

Witnesses:
FRANK H. NOVAK,
FRANK COOK.